(12) United States Patent
Chao et al.

(10) Patent No.: US 8,570,728 B2
(45) Date of Patent: Oct. 29, 2013

(54) ELECTRONIC DEVICE WITH REPLACEABLE REAR COVER

(75) Inventors: Shih-Wei Chao, New Taipei (TW); Shih-Wen Chiang, New Taipei (TW); Yen-Chi Tsai, New Taipei (TW); Po-Yen Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/193,596

(22) Filed: Jul. 28, 2011

(65) Prior Publication Data

US 2012/0314346 A1 Dec. 13, 2012

(30) Foreign Application Priority Data

Jun. 8, 2011 (TW) .............................. 100120056 A

(51) Int. Cl.
*H05K 7/00* (2006.01)
*G02F 1/1333* (2006.01)
*H04N 5/64* (2006.01)

(52) U.S. Cl.
USPC ........ 361/679.21; 349/58; 348/836; 348/373; 361/679.26; 345/169

(58) Field of Classification Search
USPC .................. 361/679.01–679.02; 345/169; 248/917–924
See application file for complete search history.

(56) References Cited

U.S. PATENT DOCUMENTS 5,168,429 A * 12/1992 Hosoi ...................... 361/679.09
2008/0019089 A1 * 1/2008 Chi et al. ...................... 361/681

* cited by examiner

*Primary Examiner* — Zachary M Pape
*Assistant Examiner* — Douglas Burtner
(74) *Attorney, Agent, or Firm* — Altis & Wispro Law Group, Inc.

(57) ABSTRACT

An electronic device includes a frame, a display mounted within the frame, a rear cover, and two switch mechanisms slidably connected to two lateral surfaces of the frame. The rear cover includes at least two opposite hooks on two opposite flanges and two opposite recessed portions on the bottom of two opposite sides thereof, respectively. Each of the two switch mechanisms includes at least one hook portion engaged with a corresponding one of the at least two hooks, and a handle exposed by each of the recessed portions. The handles are forced by an external force to switch the at least two hooks and the at least two hook portions between an engagement state and a disengagement state.

1 Claim, 6 Drawing Sheets

ELECTRONIC DEVICE WITH REPLACEABLE REAR COVER

BACKGROUND

1. Technical Field

The present disclosure relates to electronic devices and, particularly, to an electronic device with a replaceable rear cover.

2. Description of Related Art

Some electronic devices include a frame, a display mounted within the frame, and a rear cover slidably connected to the frame. When replacing an old rear cover with a new rear cover, the old rear cover is slid out from the frame, and the new rear cover is slidably connected to the frame. However, repeated sliding makes a surface of the frame smooth. As a result, the new rear cover can become easily disengaged from the frame.

Therefore, what is needed is an electronic device with a replaceable rear cover to overcome the described limitations.

DETAILED DESCRIPTION

Figure 1:
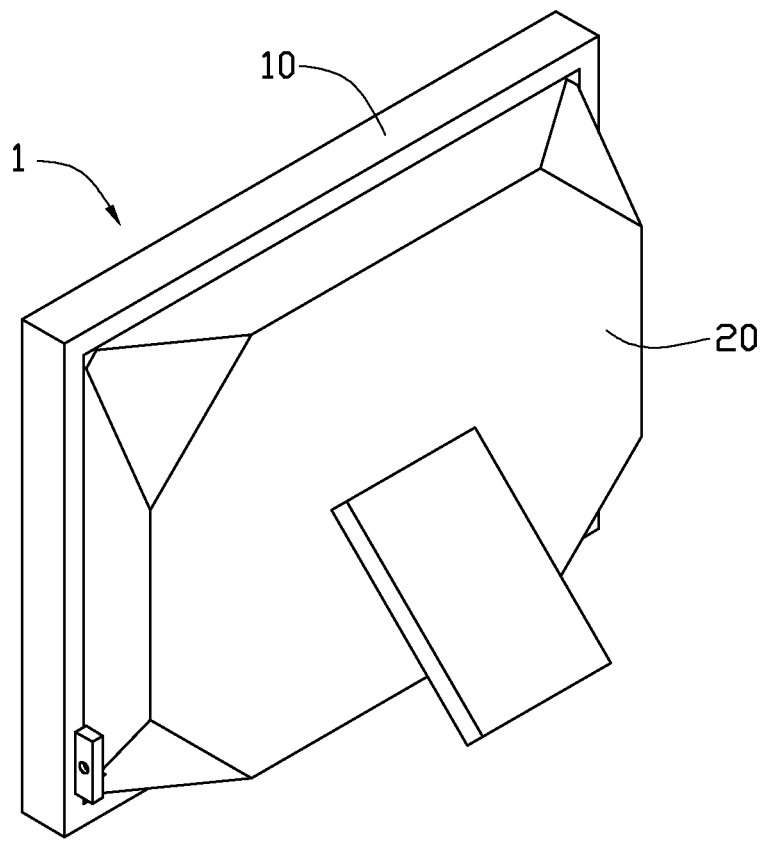
FIG. 1 is an isometric view of an electronic device with a replaceable rear cover, in accordance with an exemplary embodiment.
Figure 2:
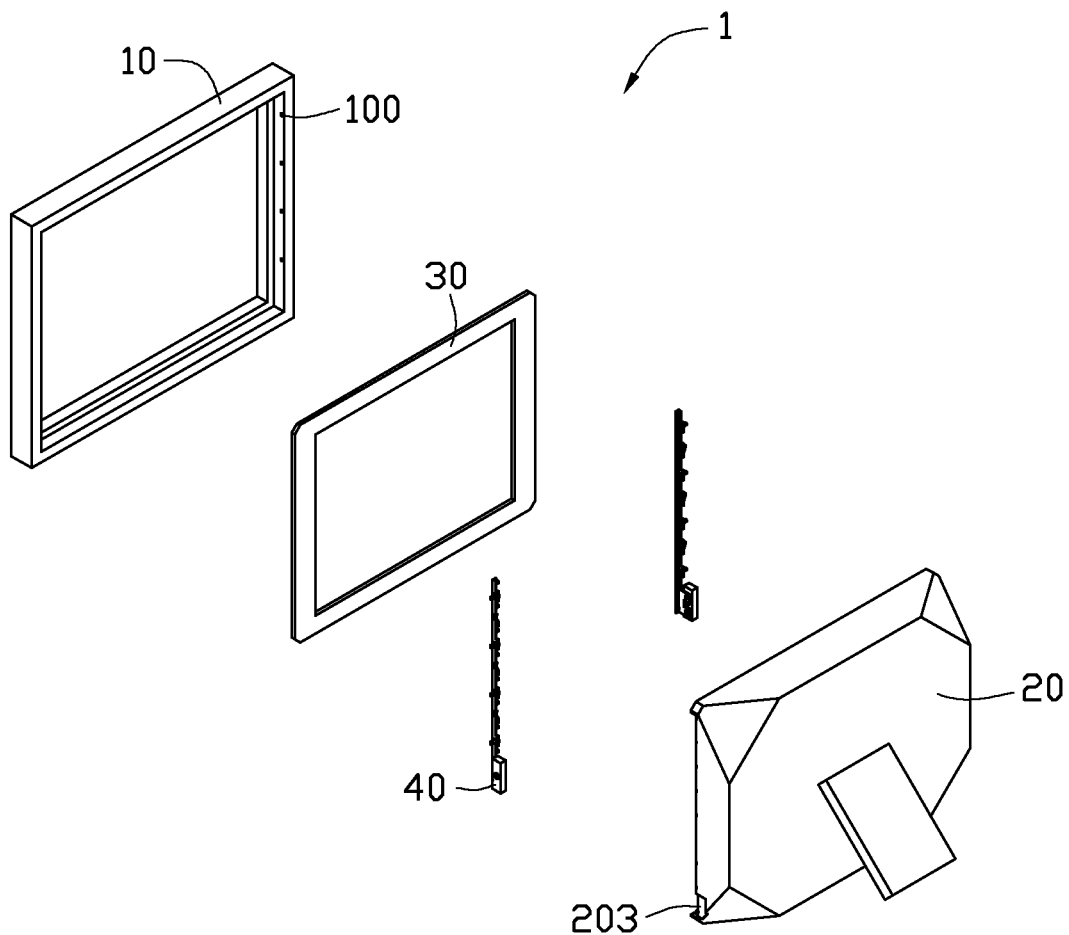
FIG. 2 is an exploded view of the electronic device of FIG. 1.
Figure 3:
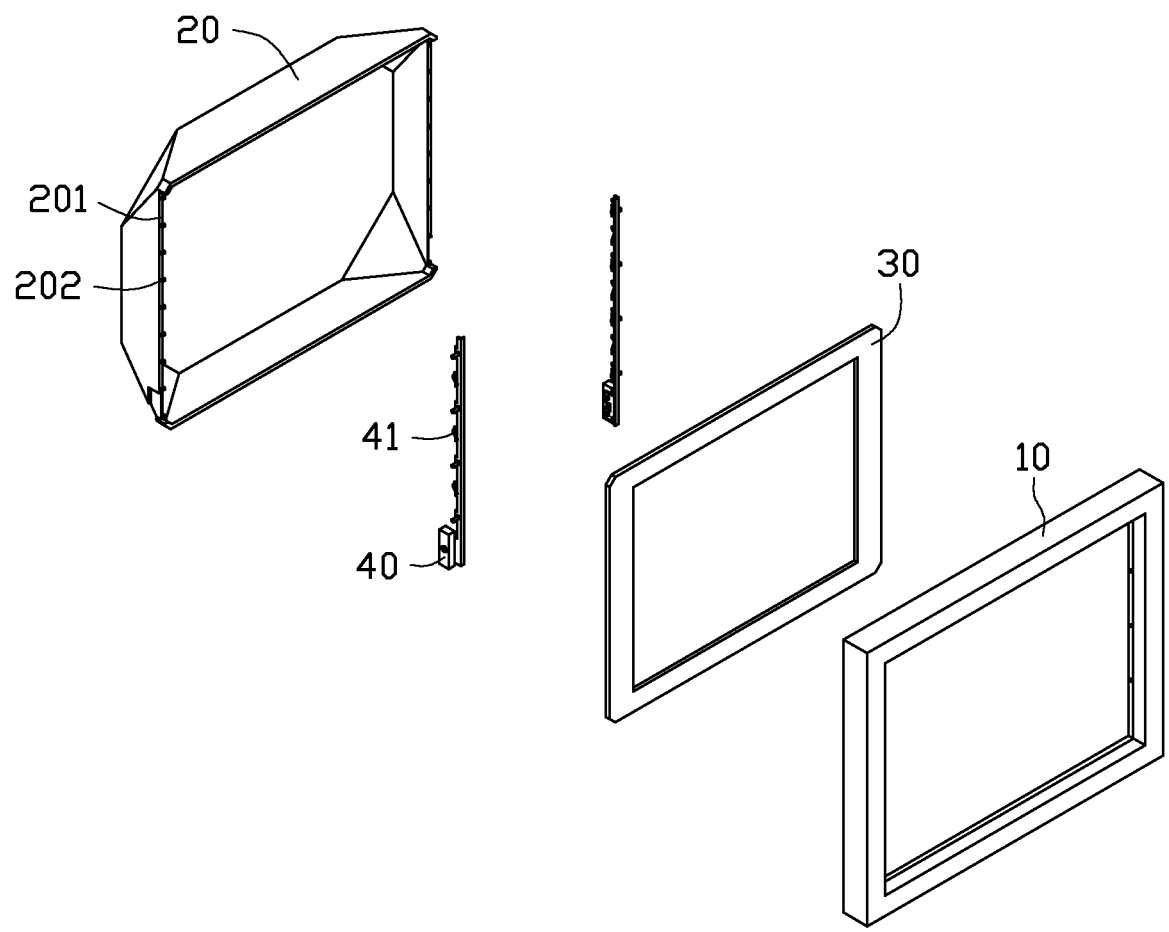
FIG. 3 is an exploded view of the electronic device of FIG. 1, viewed from another aspect.

Referring to FIGS. 1-3, an electronic device 1 with a replaceable rear cover is provided. The electronic device 1 includes a frame 10, a display 30 mounted within the frame 10, and a rear cover 20. In one embodiment, the electronic device 1 is a notebook computer. In other embodiment, the electronic device 1 may be mobile phones, or PDAs.

The rear cover 20 includes at least two opposite hooks 202 protruding from two opposite flanges 201, and two recessed portions 203 defined in the bottom of the two sides.

The electronic device 1 further includes two opposite switch mechanisms 40 slidably connected to two opposite sides of the frame 10. Each switch mechanism 40 includes at least one hook portion 41 and a handle 48. The hook portion 41 engages with the hook 202, thereby engaging the rear cover 20 on the frame 10. The handle 48 is exposed from the electronic device 1 by the recessed portion 203, and is forced by an external force to switch the hook portion 41 and the hook 202 between an engagement state and a disengagement state, thereby switching the rear cover 20 and the frame 10 between an engagement state and a disengagement state. In order to better understand the disclosure, an exemplary embodiment is described in detail.

Figure 4:
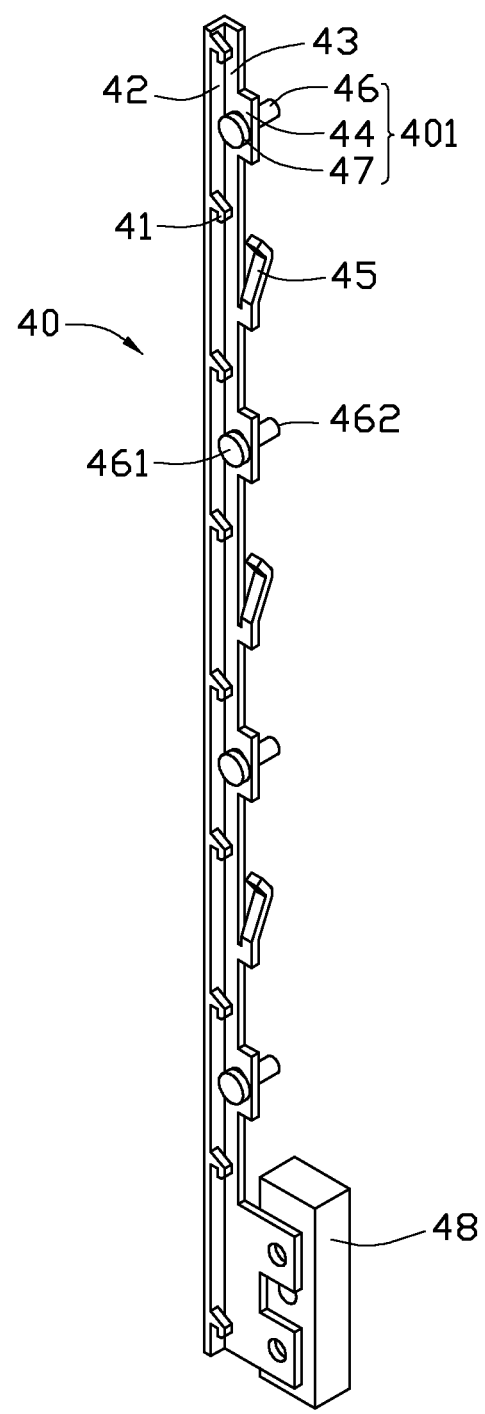
FIG. 4 is an enlarged view of a switch mechanism of the electronic device of FIG. 1.

Referring to FIG. 4, each switch mechanism 40 further includes a first sidewall 42, and a second sidewall 43 perpendicularly extending from a flange of the first sidewall 42. The at least one hook portion 41 is mounted on the first sidewall 42. The second sidewall 43 is substantially parallel to a lateral surface of the frame 10. The handle 48 is mounted on the second sidewall 43. In one embodiment, there are nine hooks 202 and nine hook portions 41. In other embodiments, a number of the hooks 202 and the hook portions 41 can be set according to the need of the user.

The frame 10 defines at least two opposite receiving groves 100 on the opposite lateral surfaces.

Each switch mechanism 40 further includes at least one sliding portion 401 mounted on the second sidewall 43. The sliding portion 401 is slidably received into the receiving groove 100, thereby slidably connecting the switch mechanism 40 to the frame 10. In one embodiment, the sliding portion 401 includes at least one sliding element 46, and an extending portion 44 extending from the flange of the second sidewall 43. The extending portion 44 defines a perforation 47. The sliding element 46 includes a first end 462, and a second end 461 opposite to the first end 462. The size of the first end 462 is less than that of the perforation 47, and the size of the second end 461 exceeds that of the perforation 47. The first end 462 passes through the perforation 47, and is slidably received into the receiving groove 100, thereby slidably connecting the switch mechanism 40 to the frame 10. In one embodiment, the width size of the receiving groove 100 exceeds that of the first end 462 of the sliding element 46, thereby making the sliding element 46 slide within the receiving groove 100. In other embodiments, the sliding portion 401 may be other shaped structures.

Each switch mechanism 40 further includes at least one elastic element 45 mounted on the flange of the second sidewall 43. The elastic element 45 resists the lateral surface of the frame 10 when the sliding element 46 slides along the receiving groove 100, thereby allowing the switch mechanism 40 to remain in any position on the lateral surface of the frame 10.

Figure 5:
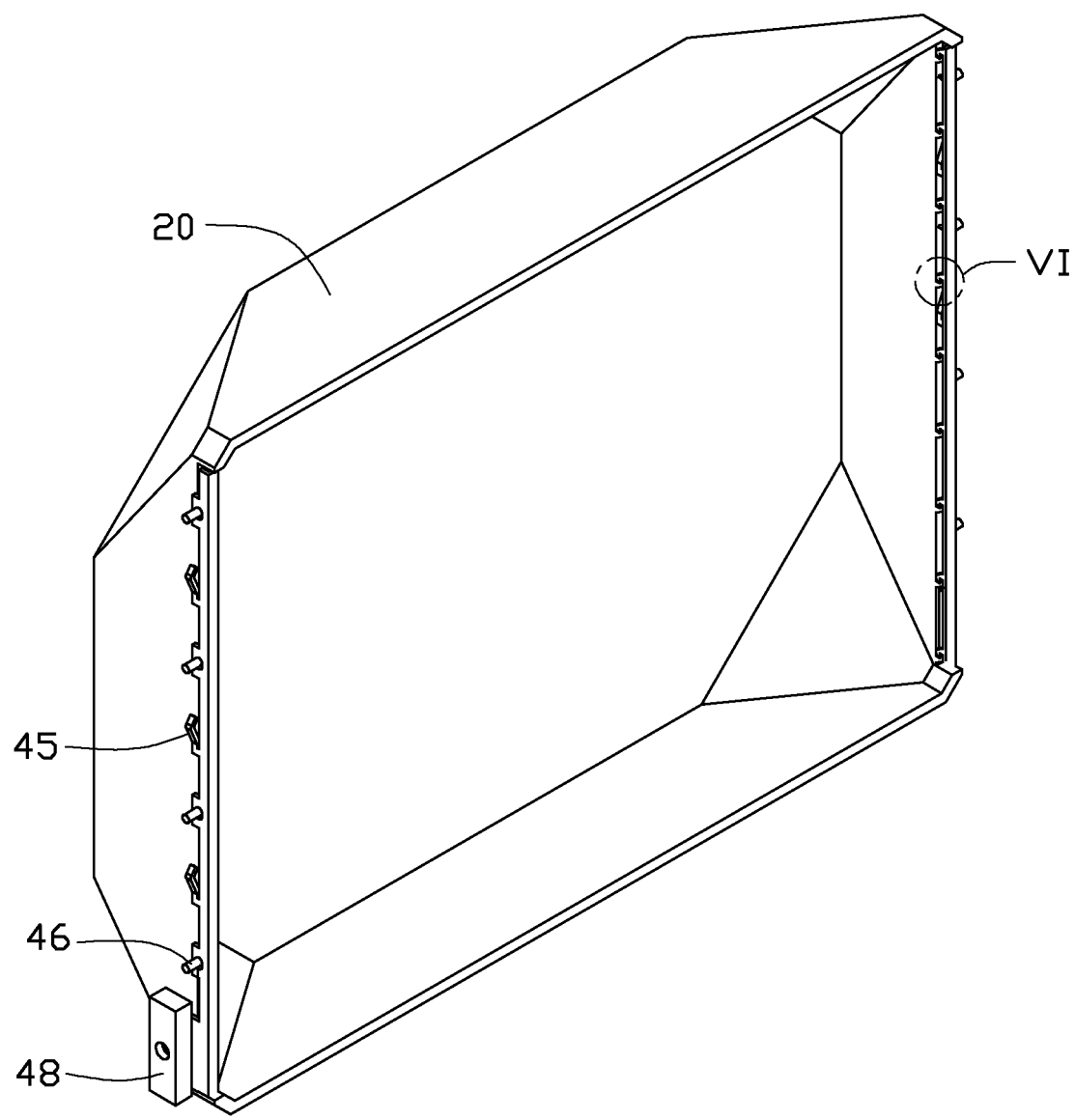
FIG. 5 shows the rear cover engaging with the switch mechanism of FIG. 4.
Figure 6:
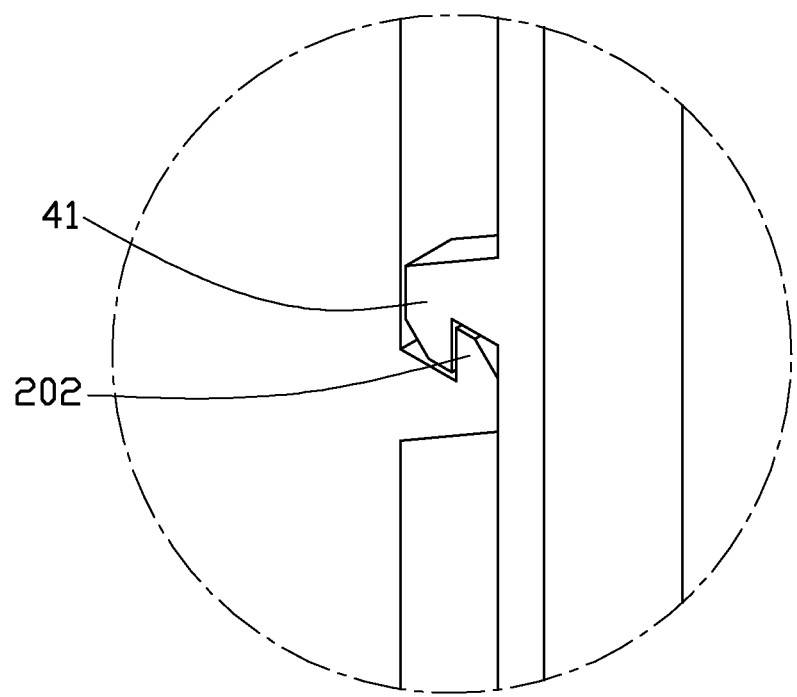
FIG. 6 is an enlarged view of the circled portion VI of FIG. 5.

Referring to FIGS. 5-6, to replace the rear cover 20, the handle 48 is pushed up by the user. The sliding element 46 is driven by the handle 48 to move up along the receiving groove 100, the elastic element 45 resists the lateral surface of the frame 10, allowing the switch mechanism 40 to remain in any position on the lateral surface of the frame 10. During a movement of the switch mechanism 40, the hook portion 41 disconnects from the hook 202, thereby providing convenience for the user to take out the rear cover 20 from the frame 10, and replace the rear cover 20.

After the rear cover 20 is replaced, and is installed on the frame 10, the hook portion 41 of the switch mechanism 40 is placed aligning with the hook 202, the handle 48 is pulled down by the user to engage the hook portion 41 on the hook 202, thereby engaging the rear cover 20 on the frame 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
   a frame comprising at least two opposite receiving grooves on two opposite lateral surfaces thereof;
   a display mounted within the frame;
   a rear cover comprising at least two opposite hooks on two opposite flanges thereof, and two recessed portions on the bottom of two opposite sides thereof, respectively; and
   two switch mechanisms slidably connected to two lateral surfaces of the frame, wherein each of the two switch mechanisms comprises at least one hook portion engaged with a corresponding one of the at least two hooks, and a handle exposed by each of the recessed portions; each of the two switch mechanisms further comprises a first sidewall, a second sidewall perpendicularly extending from a flange of the first sidewall, at least one sliding portion mounted on the second sidewall, and at least one elastic element mounted on a flange of the second sidewall, the at least one sliding portion comprise a sliding element and an extending portion extending from a flange of the second sidewall, the extending portion defines a perforation, one end of the sliding element passes through the perforation, and is slidably received into the receiving groove, thereby slidably connecting the switch mechanism to the frame, the elastic element is configured to resist the lateral surface of the frame when the sliding element slides along the receiving groove, thereby the switch mechanism can be maintained at any position of the lateral surface of the frame through the elastic element, the at least one hook portion is mounted on the first sidewall, the handle is mounted on the second sidewall, and the second sidewall parallels the lateral surfaces of the frame;

wherein the handles are forced by an external force to switch the at least two hooks and the at least two hook portions between an engagement state and a disengagement state.

* * * * *